United States Patent [19]

Kirby

[11] 3,986,411

[45] Oct. 19, 1976

[54] TORSIONAL VIBRATION DAMPER

[75] Inventor: Charles Joseph Kirby, Indianapolis, Ind.

[73] Assignee: Wallace-Murray Corporation, New York, N.Y.

[22] Filed: May 12, 1975

[21] Appl. No.: 576,314

[52] U.S. Cl. .................. 74/574; 188/1 B
[51] Int. Cl.² ........................... F16F 15/12
[58] Field of Search .......... 74/574; 188/1 B

[56] References Cited
UNITED STATES PATENTS

| 2,987,938 | 6/1961 | Burch | 74/574 |
| 3,121,347 | 2/1964 | Rumsey | 74/574 |
| 3,303,719 | 2/1967 | Beier | 74/574 |
| 3,410,369 | 11/1968 | Ishizuka | 188/1 B |

Primary Examiner—Samuel Scott
Assistant Examiner—F. D. Shoemaker
Attorney, Agent, or Firm—Thomas J. Greer, Jr.

[57] ABSTRACT

A torsional vibration damper of the type having a hub adapted to be coupled to a rotary shaft. The hub carries an elastomer member, the elastomer member in turn carrying an inertia member. A cavity is formed at the interface between the hub and inertia members, the cavity filled with a viscous liquid. The elastomer and the viscous liquid damp torsional vibrations in the rotary shaft. By virtue of the configuration of the hub and inertia members, the elastomer also functions to seal the viscous liquid in the cavity. Further, the configuration obviates the need of separate fasteners to assemble the damper.

4 Claims, 2 Drawing Figures

TORSIONAL VIBRATION DAMPER

This invention relates to a torsional vibration damper. Such dampers are employed to reduce torsional vibrations and find extensive use in the automotive industry. Torsional vibrations arise from the force of exploding gases acting upon the pistons of an internal combustion engine. These forces are delivered intermittently to the crank shaft. Depending upon the natural torsional frequency of vibration of the crank shaft, angular vibrations of considerable magnitude may result at some engine speeds and exceed the safe elastic limit of the metal crank shaft with consequent fracture thereof.

The problems of torsional vibration in crank shafts for internal combustion engines has long engaged the attention of workers in the art and a great variety of torsional vibration dampers is known. A common form of such damper is afforded by a hub attached usually to one end of the crank shaft so as to rotate therewith. The periphery of the hub carries an elastomer member which in turn is coupled to an (outermost) inertia member. During engine operation, the damper member serves to damp or lessen the magnitude of the angular vibrations of the crank shaft to which it is attached. Being coupled directly to the crank shaft, this lessens the likelihood of a fracture in the crank shaft due to the torsional vibrations exceeding, for example, the yield point of the crank shaft. Torsional vibrational dampers are also known which employ a liquid of high viscosity. Such an arrangement is afforded by a hub member which carries a closed, annular cavity therein, the annular cavity being filled with a liquid of high viscosity and with an annular inertia member. The only coupling between the inertia member and the hub, the latter being connected to the crank shaft, is the viscous liquid. The prior art is also aware of torsional vibration dampers which employ both viscous and elastomer dampers. While not intended to be exhaustive, the attention of the reader is invited to the following U.S. Pat. Nos. as illustrative of such prior constructions: 1,230,205, issued to Nichols; 2,585,382, issued to Guernsey; 2,636,399, issued to O'Connor; 2,939,338, issued to Troyer; 3,373,633, issued to Desmond; 3,410,369, issued to Ishizuka; 3,440,899, issued to McGavern; 3,495,475, issued to Rumsey; 3,678,783, issued to Aoki; 3,640,149, issued to McLean; 3,641,839, issued to Greeley; 3,771,380, issued to Bahr; and 3,823,619, issued to Shotwell. Such devices are usually classified at present in the U.S. Patent Office in Class 74, Subclass 574.

While many such devices have in general performed their stated functions and have carried out their modes of operation as intended, many have suffered the drawback of relatively high expense entailed in their fabrication. For example, it has sometimes been necessary to employ fastening elements in the form of elongated rivets or the like for the purpose of assembling the damper. Further, it has sometimes been necessary to employ separate seal elements, in addition to the elastomer member or members, for the purpose of maintaining the viscous liquid in the annular cavity. According to the practice of this invention, the requirement for separate fastening elements to hold the damper assembly together and/or the requirement for separate sealing elements to hold the viscous liquid in its cavity is obviated. By virtue of the practice of this invention, the elastomer members, employed to at least partially convert the torsional energy of vibration into heat for dissipation, are also employed as seal members for the viscous fluid. The practice of the present invention also admits of economies in damper assembly by virtue of the simplicity of the damper configuration.

IN THE DRAWINGS

Figure 1:
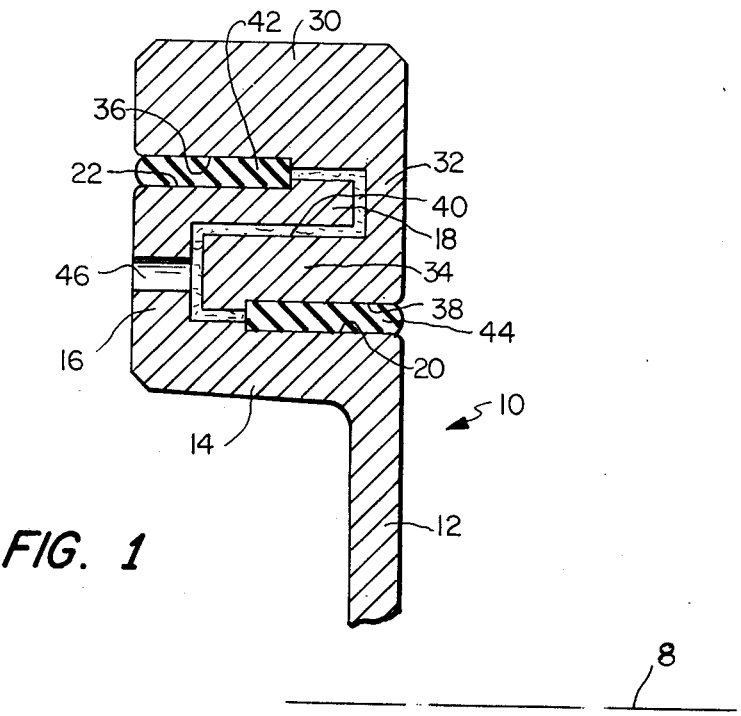
FIG. 1 is an axial cross-section showing the upper half of a torsional vibration damper constructed in accordance with this invention.

Referring now to the drawings, the numeral 10 denotes the hub of a torsional vibration damper constructed in accordance with this invention, the hub adapted to be coupled to a rotary shaft (not illustrated) subject to torsional vibration during its rotation. The axis of rotation of the shaft is denoted by the numeral 8. The numeral 12 denotes the web or radially innermost portion of the hub. The exact manner of attachment of the hub to the shaft plays no role in this invention. The web 12 lies generally in a radial plane, i.e., a plane orthogonal to axis 8, and is integrally connected with annular, axially extendng portion 14. In turn, portion 14 is integral with a second radially extending and annular portion 16 and the radially outermost portion of the hub 10 terminates in an annular, axially extending portion 18.

The numeral 30 denotes the radially outermost axially extending portion of the inertia member, the inertia member being integral at one axial end thereof with radially extending portion 32 in turn terminating in a second axially extending portion 34.

Figure 2:
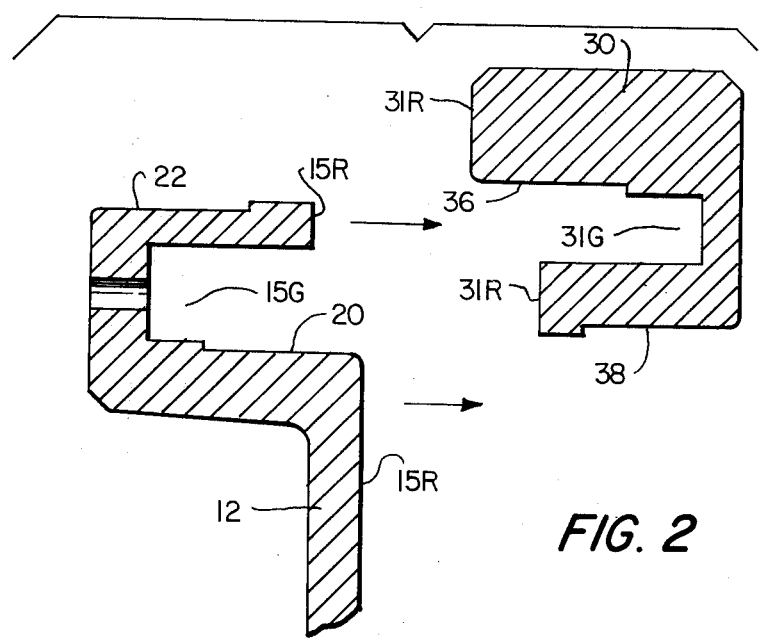
FIG. 2 is a view similar to FIG. 1 and illustrates the inertia and hub members prior to assembly.

As shown at FIG. 2 of the drawings, the configuration of the hub member 10 defines a continuous angular groove 15g between two land portions 15r. Annular depressions 20 and 22 are formed on the axially extending portions of the hub and adjacent the two axial faces or lands 15r.

Similarly, the configuration of inertia member 30 defines a continuous annular groove 31g adjacent land portions 31r. Angular depressions 36 and 38 are formed as indicated in the inertia member. By comparison of FIGS. 1 and 2, the reader will observe that the radially innermost annular land portion 31r of the inertia member is received by groove 15g of the hub member, while the radially outermost land portion 15r of the hub is received by groove 31g of the inertia member. The elements are so configured that the annular depressions or recesses 22 and 36 face one another to define an annular pocket which receives annular elastomer element 42. Similarly, annular depressions 20 and 38 face each other to define an annular pocket which receives annular elastomer member 44. By techniques well known in this art, the elastomer members 42 and 44 are bonded to surfaces 20-38 and 36-22 in these annular pockets. The configuration of the hub and inertia members is further such that, after assembly, as shown in FIG. 1, a generally serpentine channel denoted by the numeral 40 is defined. The configuration of the lands and groove in the hub and inertia members defines a recurved zone, similar to a U-shape in cross-section. One end of the channel opens on the left face of the damper and is sealed by elastomer 42. The other end of the channel opens on the right face of the damper and is sealed by elastomer member 44. A fill hole 46 is employed to insert the viscous fluid into the serpentine channel 40. After filling, a suitable plug, as in the manner of a threaded fastener may be employed to close the fill hole 46.

As may be seen especially from FIG. 1, the hub and the inertia member are coupled together with their axially extending portions (14,18 and 30,34, respectively) defining annular fingers which are interdigitated. The annular fingers extend from the radially extending annular portions 16 and 32, respectively.

Typical dimensions of the completed damper assembly are as follows, it being understood that they are given by way of example only and are not intended in any way to limit the invention.

The thickness of channel 40 is 0.060 inches, the radial thickness of elastomer elements 42 and 44 is 0.14 inches, and the axial extent of each elastic member is one inch. The maximum diameter of the completed assembly is 11 inches, while the minimum diameter of portion 14 of the hub member is 7.8 inches. The hub and inertia members are formed of metal. The exact composition of the viscous fluid, the exact type of elastomer employed as numbers 42 and 44, and the exact mode of bonding them to the assembly are well known in the art and accordingly are not set out. U.S. Pat. No. 2,939,338 issued to Troyer sets out, for example, such techniques.

In the claims, the phrase —half-axial cross-section— refers to the half-section of FIG. 1, since a complete axial cross-section would include simply a mirror image of FIG. 1 below the axis 8.

What is claimed is:

1. A torsional vibration damper adapted to damp torsional vibrations of a rotary shaft, including an annular hub adapted to be secured to a rotary shaft, and an annular inertia member coupled thereto, the improvement comprising, a. said inertia member having a plurality of axially directed annular fingers extending from a radially extending annular portion of the inertia member,
   b. said hub member having a plurality of axially directed annular fingers extending from a radially extending annular portion of the hub member,
   c. said hub fingers and said inertia member fingers being interdigitated and with axial and radial clearances between them, the clearances defining a generally serpentine channel in half axial cross-section of the damper,
   d. first and second annular elastomer members sealing the ends of the serpentine channel, on opposite radial faces of the damper, and viscous fluid in the channel,
   e. whereby the hub and the inertia members are each of a one-piece construction.

2. The torsional vibration damper of claim 1 wherein said first and second elastomer members each extend axially from their respective radial faces of the damper and occupy a portion of the ends of said serpentine channel.

3. The torsional vibration damper of claim 2 wherein said first elastomer member is of a radial thickness greater than the radial clearance between the radially outermost finger of the hub and the radially outermost finger of the inertia member, and wherein said second elastomer member is of a radial thickness greater than the radial clearance between the radially innermost finger of the hub and the radially innermost finger of the inertia member.

4. The torsional vibration damper of claim 1 wherein the radially outermost finger of the inertia member is of the same length as the radially innermost finger of the hub member, the remaining fingers all being shorter.

* * * * *